US009502735B1

(12) United States Patent
Liu et al.

(10) Patent No.: US 9,502,735 B1
(45) Date of Patent: Nov. 22, 2016

(54) FABRICATION METHODS TO PRODUCE LITHIUM BATTERY STRUCTURES WITH COMPOSITE LAYERS

(71) Applicant: HRL Laboratories, LLC, Malibu, CA (US)

(72) Inventors: Ping Liu, San Diego, CA (US); Jocelyn Hicks-Garner, Venice, CA (US); Adam F. Gross, Santa Monica, CA (US); Jun Liu, Naperville, IL (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/169,096

(22) Filed: May 31, 2016

Related U.S. Application Data

(60) Division of application No. 14/943,027, filed on Nov. 17, 2015, which is a division of application No.
(Continued)

(51) Int. Cl.
| | |
|---|---|
| *H01M 10/0562* | (2010.01) |
| *H01M 4/38* | (2006.01) |
| *H01M 10/0525* | (2010.01) |
| *H01M 2/16* | (2006.01) |
| *H01M 4/36* | (2006.01) |
| *H01M 12/08* | (2006.01) |
| *H01M 10/0585* | (2010.01) |

(52) U.S. Cl.
CPC ....... *H01M 10/0562* (2013.01); *H01M 2/1646* (2013.01); *H01M 4/382* (2013.01); *H01M 10/0525* (2013.01); *H01M 4/366* (2013.01); *H01M 10/0585* (2013.01); *H01M 12/08* (2013.01); *H01M 2300/0071* (2013.01)

(58) Field of Classification Search
CPC .............. H01M 2/1646; H01M 2/1686; H01M 10/0562; H01M 10/0525; H01M 10/0585; H01M 4/382; H01M 12/08; H01M 2300/0071
See application file for complete search history.

(56) References Cited

U.S. PATENT DOCUMENTS

| | | | |
|---|---|---|---|
| 7,282,296 B2 | 10/2007 | Visco et al. | |
| 7,282,302 B2 | 10/2007 | Visco et al. | |

(Continued)

OTHER PUBLICATIONS

Herbert et al. (Thin Solid Films vol. 520 pp. 413-418, 2001).*
(Continued)

*Primary Examiner* — Patrick Ryan
*Assistant Examiner* — Aaron Greso
(74) *Attorney, Agent, or Firm* — O'Connor & Company

(57) ABSTRACT

This invention provides lithium-based batteries that include one or more inorganic barrier layers disposed between the anode and the cathode. The inorganic barrier layer is a lithium-ion conductor and is non-permeable to lithium-containing compounds, such as lithium polysulfides or lithium dendrites. The inorganic barrier layer may be in direct contact with the anode or cathode, or electrically isolated from the anode and cathode. The principles disclosed herein solve the problem of maintaining electrical isolation of the anode and cathode, while providing efficient lithium-ion conduction without crossover of other lithium species that would otherwise limit the power performance of the battery.

9 Claims, 18 Drawing Sheets

Related U.S. Application Data

13/208,341, filed on Aug. 12, 2011, now Pat. No. 9,252,455, which is a continuation-in-part of application No. 12/759,720, filed on Apr. 14, 2010, now Pat. No. 8,481,195.

(56) References Cited

U.S. PATENT DOCUMENTS

| | | | |
|---|---|---|---|
| 7,390,591 B2 | 6/2008 | Visco et al. | |
| 7,838,144 B2 | 11/2010 | Visco et al. | |
| 7,858,223 B2 | 12/2010 | Visco et al. | |
| 7,931,989 B2 | 4/2011 | Klaassen | |
| 2001/0041294 A1* | 11/2001 | Chu | H01M 4/045 429/231.9 |
| 2004/0197641 A1* | 10/2004 | Visco | H01M 6/04 429/137 |
| 2009/0246636 A1* | 10/2009 | Chiang | H01M 2/166 429/231.95 |

OTHER PUBLICATIONS

Pankaj Arora and Zhengming Zhang, "Battery Separators", Chem. Rev. 2004, 104, 4419-4462.

Yuriy V. Mikhaylik and James R. Akridge, "Polysulfide Shuttle Study in the Li/S Battery System", Journal of The Electrochemical Society, 151 (11) A1969-A1976, 2004.

\* cited by examiner

FABRICATION METHODS TO PRODUCE LITHIUM BATTERY STRUCTURES WITH COMPOSITE LAYERS

PRIORITY DATA

This patent application is a divisional application of U.S. patent application Ser. No. 14/943,027, filed Nov. 17, 2015 (now allowed), which is a divisional application of U.S. Pat. No. 9,252,455, granted Feb. 2, 2016, which in turn is a continuation-in-part of U.S. Pat. No. 8,481,195, issued Jul. 9, 2013, each of which is hereby incorporated by reference herein for all purposes.

FIELD OF THE INVENTION

The present invention generally relates to improved battery structures, such as lithium-ion, lithium-sulfur, and lithium-air batteries.

BACKGROUND OF THE INVENTION

Batteries based on lithium (Li), such as lithium-ion batteries, are attractive due to their high energy density compared to other commercial batteries. Lithium-ion batteries are used commercially today in computers, cell phones, and related devices.

Lithium-based batteries (including lithium-ion, lithium-sulfur, and lithium-air systems) have significant potential in transportation applications, such as electric vehicles. For transportation-related applications, long cycle life is a requirement. Presently, this requirement has not been met.

Battery lifetime is often a critical factor in the marketplace, especially for commercial, military, and aerospace applications. Previous methods of extending battery life include employing long-life cathode and anode materials, and restricting battery operation to avoid conditions detrimental to battery life. Examples of such detrimental conditions include high and low temperatures, high depths of discharge, and high rates. These restrictions invariably lead to under-utilization of the battery, thus lowering its effective energy density. In addition, precise control of cell temperature with aggressive thermal management on the pack level is usually required, which adds significantly to system weight, volume, and cost.

A problem in the art associated with lithium-sulfur, lithium-air, and lithium-ion batteries is undesirable chemical migration that results in parasitic chemical reactions at the anode or cathode. For example, in batteries with manganese oxide and iron phosphate cathodes, dissolved metal ions often migrate to the anode where they are reduced and compromise the integrity of the solid electrolyte interface layer. Battery capacity degrades due to consumption of active ions. Battery storage and cycle life can be greatly improved if such undesirable chemical interactions are reduced or eliminated.

A successful battery separator layer should have a wide electrochemical stability window to be stable against the battery anode and cathode. In addition, the separator layer needs to have limited electronic conductivity in order to prevent electrical leakage between the two electrodes. When both requirements are imposed, the available materials are very limited.

It has proven difficult to maintain electrical isolation of the anode and cathode, while at the same time, provide lithium-ion conduction that will not limit the power performance of the battery cell. It would be beneficial to achieve thin-film solid-state ion conduction through a supported battery material layer on a porous polymer substrate. Such a configuration could potentially enable the use of electronically conductive materials, allow deposition of battery materials at low temperatures, relieve requirements relating to mechanical robustness, and contribute little (<50 mV) additional polarization.

Lithium-sulfur batteries have a theoretical energy density of 2500 Wh/kg. In practice, this energy density is not realized primarily due to an internal shorting mechanism. During discharge, when lithium and sulfur react, polysulfides are formed. These lithium-sulfur polymer compounds are soluble in the electrolyte and migrate in self-discharge from the cathode to the anode, creating a "soft" short within the cell. The impact of this soft short is a reduction of cycle life, energy density and cycling efficiency, as the polysulfides continue to build on the anode, and sulfur is lost from the cathode to the anode.

Prior approaches attempting to reduce polysulfide crossover in lithium-sulfur cells include cathode nanostructuring or encapsulation, electrolyte optimization (e.g., salt concentration or solvent composition), electrolyte additives (such as $LiNO_3$) to protect lithium, and dual-phase or multilayer electrolytes. None of these approaches has the potential to completely eliminate self-discharge. What is needed is a cell configuration that can stop the crossover to, and deposition of, polysulfides formed during discharge on the anode. More generally, the configurations should prevent crossover of various lithium-containing compounds produced by lithium reactions (e.g., lithium polysulfides or other lithium-containing polymers, lithium dendrites, etc.).

The formation of lithium dendrites at the anode can also limit the cycle life of a lithium sulfur battery by driving up the cell resistance. Dendrites are formed during the charge cycle as lithium is deposited on the anode. If the current density is not uniform across the surface of the lithium anode, the lithium can be preferentially deposited in the areas with the highest current density. Deposition in these areas exacerbates the current density non-uniformity which propagates the formation of lithium dendrites on the anode. As the number of dendrites on the surface of the anode increases, the cell resistance increases, limiting the power performance of the cell. In addition, as the dendrites propagate, it is possible they will create a short in the cell as they move through the separator to the cathode. What is needed is a cell configuration that suppresses the formation of lithium dendrites during charge.

In view of the foregoing shortcomings, new battery cell structures are needed to address important commercialization issues associated with lithium-sulfur, lithium-air, and lithium-ion batteries.

SUMMARY OF THE INVENTION

The present invention addresses the aforementioned needs in the art, as will now be summarized and further described in detail herein.

In some variations, the invention provides a lithium-based battery comprising:
  (a) an anode for supplying or receiving lithium ions;
  (b) a cathode for receiving or supplying the lithium ions;
  (c) an electrolyte for transporting the lithium ions between the anode and the cathode;
  (d) a separator for electrically isolating the anode and the cathode, wherein the separator is permeable to the lithium ions; and (e) an inorganic barrier layer disposed between the anode and the cathode, wherein the inorganic barrier layer is a lithium-ion conductor and is non-permeable to at least one lithium-containing compound produced by a lithium reaction at the cathode.

In some embodiments, the lithium-containing compounds produced by a lithium reaction at the cathode include lithium dendrites. That is, in some embodiments, the inorganic barrier layer is non-permeable to lithium dendrites. Preferably, the inorganic barrier layer is structurally rigid and continuous.

The inorganic barrier layer may be in direct contact with the cathode or with the anode. In some embodiments, the inorganic barrier layer is electrically isolated from the anode. In certain embodiments, the inorganic barrier layer is electrically isolated from the anode and from the cathode.

The inorganic barrier layer is coated onto a barrier substrate, such as (but not limited to) a porous polymer, in some embodiments. The barrier substrate may be in direct contact with the separator and/or with the cathode. Optionally, the inorganic barrier layer may be coated directly onto the separator, which can serve as an effective substrate for the barrier layer in some embodiments.

In some embodiments, the battery further comprises a second inorganic barrier layer disposed between the anode and the cathode, wherein the second inorganic barrier layer is a lithium-ion conductor. The second inorganic barrier layer may be electrically isolated from the anode and from the cathode. In some embodiments, each of the inorganic barrier layer and the second inorganic barrier layer is electrically isolated from the anode and from the cathode.

In certain embodiments of the invention, a battery comprises a barrier substrate coated on one side with a first inorganic barrier layer and coated on the opposite side with a second inorganic barrier layer.

The inorganic barrier layer may include one or more compounds selected from the group consisting of $VO_x$ ($x \leq 2.5$), $MnO_x$ ($x \leq 2$), $Li_xMn_2O_4$ ($0 \leq x \leq 2$), $Li_xCoO_2$ ($0 \leq x \leq 1$), $Li_xTiO_2$ ($0 \leq x \leq 1$), $Li_{3+x}Ti_5O_{12}$ ($0 \leq x \leq 4$), $Li_xTiS_2$ ($0 \leq x \leq 1$), $Li_xNiO_2$ ($0 \leq x \leq 1$), $Li_xV_2O_y$ ($0 \leq x \leq 5$, $4 \leq y \leq 5$), $Li_xWO_3$ ($0 \leq x \leq 0.5$), $Li_xNb_2O_5$ ($0 \leq x \leq 3$), $Li_xFePO_4$ ($0 \leq x \leq 1$), $Li_xCoPO_4$ ($0 \leq x \leq 1$), $Li_xVPO_4$ ($0 \leq x \leq 1$), and combinations thereof, for example. Other compositions for the solid-state barrier layer(s) are possible.

Some variations of the present invention provide a lithium-sulfur battery comprising:
(a) an anode for supplying or receiving lithium ions;
(b) a sulfur-containing cathode for receiving or supplying the lithium ions;
(c) an electrolyte for transporting the lithium ions between the anode and the cathode;
(d) a separator for electrically isolating the anode and the cathode, wherein the separator is permeable to the lithium ions; and
(e) an inorganic barrier layer disposed between the anode and the cathode, wherein the inorganic barrier layer is a lithium-ion conductor and is non-permeable to polysulfides of lithium.

The inorganic barrier layer of this lithium-sulfur battery is preferably chemically stable in the presence of lithium and sulfur. The inorganic barrier layer is preferably non-permeable to lithium dendrites.

Some variations of the present invention provide a lithium-air battery comprising:
(a) an anode for supplying or receiving lithium ions;
(b) a cathode for receiving or supplying the lithium ions;
(c) an electrolyte for transporting the lithium ions between the anode and the cathode;
(d) a separator for electrically isolating the anode and the cathode, wherein the separator is permeable to the lithium ions; and
(e) an inorganic barrier layer disposed between the anode and the cathode, wherein the inorganic barrier layer is a lithium-ion conductor and is non-permeable to water.

The inorganic barrier layer of this lithium-air is preferably chemically stable in the presence of moisture and oxygen. The inorganic barrier layer is preferably non-permeable to lithium dendrites.

Some variations of the present invention provide a lithium-ion battery comprising:
(a) an anode for supplying or receiving lithium ions;
(b) a cathode for receiving or supplying the lithium ions;
(c) an electrolyte for transporting the lithium ions between the anode and the cathode;
(d) a separator for electrically isolating the anode and the cathode, wherein the separator is permeable to the lithium ions; and
(e) an inorganic barrier layer disposed between the anode and the cathode, wherein the inorganic barrier layer is a lithium-ion conductor and is non-permeable to at least one lithium-containing compound produced by a lithium reaction at the cathode.

The inorganic barrier layer of this lithium-air is preferably chemically stable in the presence of water. The inorganic barrier layer is preferably non-permeable to water.

The present invention also provides methods of fabricating a lithium-based battery cell, the method comprising disposing an inorganic barrier layer between a lithium-containing anode and a cathode, and electrically isolating the anode from the cathode with a separator layer, wherein the inorganic barrier layer is a lithium-ion conductor and is non-permeable to at least one lithium-containing compound produced by a lithium reaction at the cathode.

In some method embodiments, the inorganic barrier layer is formed by sol-gel synthesis comprising the steps of forming a sol-gel comprising a selected inorganic compound, or a precursor thereof; applying a sol-gel layer comprising the sol-gel to a surface-modified substrate, drying the sol-gel layer, to form the inorganic barrier layer comprising the selected inorganic compound; and introducing the inorganic barrier layer into the battery cell. The sol-gel layer may be formed by dip-coating, spin-coating, or another coating technique. The surface-modified substrate may be prepared by etching the surface to improve adhesion of the sol-gel. Alternatively, or additionally, the surface-modified substrate may be prepared by applying an adhesive layer to the surface to improve adhesion of the sol-gel.

In some method embodiments, the inorganic barrier layer is formed by pulsed direct-current sputter deposition, wherein the inorganic barrier layer is a lithium-ion conductor, and wherein the sputter deposition comprises the steps of impacting a sputtering source comprising a selected inorganic compound, or a precursor thereof, with a sputtering gas under vacuum to form the inorganic barrier layer on a substrate; and introducing the inorganic barrier layer into the battery cell. In some embodiments, the sputtering source comprises a selected metal, the sputtering gas comprises an oxidant that converts the selected metal to a selected metal oxide, and the inorganic barrier layer comprises the selected metal oxide.

The disclosed methods, or other methods, may be utilized to fabricate the battery configurations provided by the invention. In some embodiments, a lithium-sulfur battery cell is fabricated, wherein the inorganic barrier layer is non-permeable to polysulfides of lithium. In some embodiments, a lithium-ion or lithium-air battery is fabricated, wherein the inorganic barrier layer prevents the propagation of lithium dendrites from the anode to the cathode.

DETAILED DESCRIPTION OF EMBODIMENTS OF THE INVENTION

Figure 1:
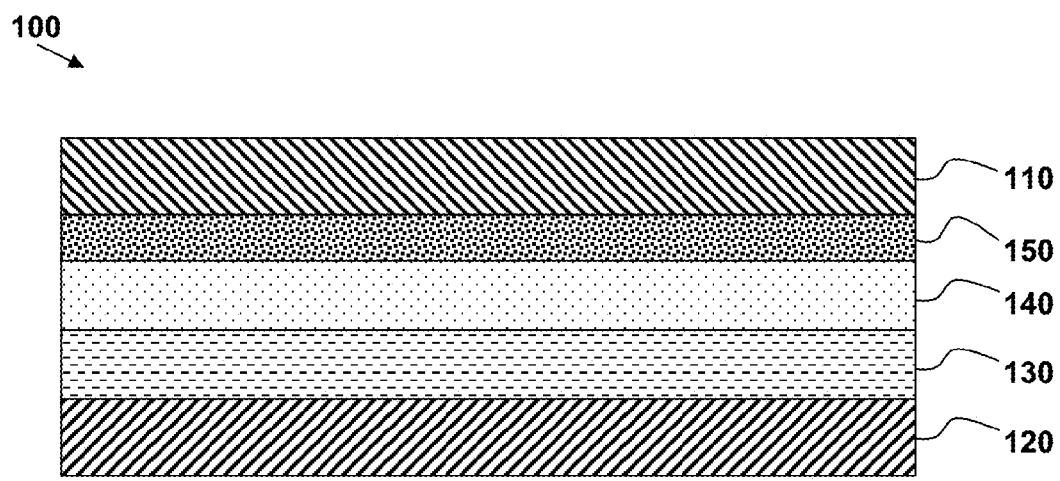
FIG. 1 is a schematic of an inorganic barrier layer coated on one side of a substrate in the battery cell structure configuration of some embodiments of the invention.

The structures and methods of the present invention will be described in detail by reference to various non-limiting embodiments, examples, and figures. The figures provide representative illustration of the invention and are not limiting in their content. The figures are not to be construed as limiting in any way, and are not drawn to scale. It will be understood by one of ordinary skill in the art that the scope of the invention extends beyond the specific embodiments depicted.

Unless otherwise indicated, all numbers expressing dimensions, capacities, conductivities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

As used in this specification and the appended claims, the singular forms "a," "an," and "the" include plural referents unless the context clearly indicates otherwise. For clarity, all references to a "layer" include reference to a plurality of layers, whether disposed adjacently or non-adjacently in a cell configuration.

As used herein, "battery," "battery structure," "battery cell," "electrochemical cell," "galvanic cell," and the like are used interchangeably to mean one or more unit cells to convert chemical energy into electrical energy.

The primary functional components of a typical battery are the anode; cathode; electrolyte, in which ions move between the anode and cathode in the electrolyte; and a separator between cathode and anode to block passage of electrons (to prevent short circuiting). Current collectors, normally metal, are used to transport electrons at the cathode and anode. The active ions move from the anode to the cathode during discharge and from the cathode to the anode when charging.

As will now be further described, the principles of the invention may be applied to suppress the formation of lithium dendrites and thereby extend battery life in any lithium battery cell where the formation of lithium dendrites is a concern, such as lithium-sulfur or lithium-air cells. The principles disclosed herein may be applied to mitigate undesirable side reactions in any lithium battery cell, such as lithium-sulfur or lithium-ion cells.

In some variations of the present invention, a lithium-conductive inorganic barrier layer is introduced into a lithium-sulfur cell. The inorganic barrier layer should be selectively permeable, permitting lithium ions to traverse the barrier without allowing polysulfides generated during the operation of the lithium-sulfur cell to cross from the cathode to the anode. In addition, the inorganic barrier layer is preferably rigid to provide mechanical integrity, which can be useful in suppressing the formation and propagation of lithium dendrites.

In some embodiments, the presence of an inorganic barrier layer (or multiple layers) may increase the cycle life of a lithium-sulfur cell, improve the cycling efficiency of a lithium-sulfur cell, and/or reduce or eliminate the formation of dendrites at the lithium anode. In preferred embodiments, the addition of an inorganic barrier layer does not dramatically increase the weight of the cell, which is beneficial to retain good cell capacity. A variety of cell configurations and locations of one or more inorganic barrier layers are possible, as will be apparent from this disclosure.

In some embodiments, an inorganic barrier layer is in direct contact with a cathode. In some embodiments, an inorganic barrier layer is in direct contact with an anode. In these or other embodiments, an inorganic barrier layer is electrically isolated from the anode. In certain embodiments, an inorganic barrier layer is electrically isolated from both the anode and the cathode.

In some embodiments, an inorganic barrier layer is coated onto a "barrier substrate," such as (but not limited to) a porous polymer. The barrier substrate (or "substrate layer," or "substrate") may optionally be in direct contact with the separator or with the cathode. In certain embodiments, the inorganic barrier layer is coated directly onto a separator, possibly after surface modification to the separator layer, if necessary.

Some variations of the invention relate to lithium-sulfur battery cells wherein at least one inorganic barrier layer has been introduced. In these variations, it is preferred that the barrier layer does not substantially react with sulfur. It is also preferred that the barrier layer does not substantially react with lithium. That is, the barrier layer is preferably chemically stable in the presence of lithium and sulfur. Additionally, the barrier layer is preferably stable over the voltage range used in the lithium-sulfur cell.

In some embodiments, the inorganic barrier layer is non-permeable to lithium dendrites, or precursors to lithium dendrites. Lithium dendrites may form and grow at the anode, but the barrier layer should not allow the lithium dendrites to penetrate through the barrier layer to the opposite side.

Inorganic barrier layer compositions may include, but are by no means limited to, $VO_x$ ($x \leq 2.5$), $MnO_x$ ($x \leq 2$), $Li_xMn_2O_4$ ($0 \leq x \leq 2$), $Li_xCoO_2$ ($0 \leq x \leq 1$), $Li_xTiO_2$ ($0 \leq x \leq 1$), $Li_{3+x}Ti_5O_{12}$ ($0 \leq x \leq 4$), $Li_xTiS_2$ ($0 \leq x \leq 1$), $Li_xNiO_2$ ($0 \leq x \leq 1$), $Li_xV_2O_y$ ($0 \leq x \leq 5$, $4 \leq y \leq 5$), $Li_xWO_3$ ($0 \leq x \leq 0.5$), $Li_xNb_2O_5$ ($0 \leq x \leq 3$), $Li_xFePO_4$ ($0 \leq x \leq 1$), $Li_xCoPO_4$ ($0 \leq x \leq 1$), $Li_xVPO_4$ ($0 \leq x \leq 1$), and combinations thereof, in various embodiments.

In various embodiments, the thickness of the inorganic barrier layer is in the range of about 0.1 µm to about 1 mm, such as about 0.3-100 µm, 1-75 µm, 0.5-50 µm, 0.4-25 µm, or 0.3-10 µm; for example, about 0.5 µm, 1 µm, 1.5 µm, 5 µm, 10 µm, 20 µm, 50 µm, 75 µm, or 100 µm. The thickness of the separator and the substrate layer may also be, in some embodiments, in the range of about 0.1 µm to about 1 mm, such as about 0.3-100 µm, 1-75 µm, 0.5-50 µm, 0.4-25 µm, or 0.3-10 µm. The desired thickness of a particular layer may be adjusted depending on the composition of the layer, to account for the properties of the layer or for economic reasons or other reasons.

Some embodiments of the invention relate to the lithium-ion cell structure depicted in FIG. 1. The multilayer configuration 100 includes a sulfur cathode 110, a lithium anode 120, a separator 130, a substrate 140, and an inorganic barrier layer 150. The inorganic barrier layer 150 material, such as $V_2O_5$, is placed in direct contact with the sulfur cathode 110. The substrate 140 material, such as Celgard® 3300, is coated on one side with the inorganic barrier layer 150. The opposite side of the substrate 140 material is adjacent to the separator 130, which is in contact with the lithium anode 120. In this configuration of FIG. 1, polysulfides generated in the sulfur cathode 110 are less likely to become trapped between the inorganic barrier layer 150 and the anode 120. This configuration may also increase the electrical conductivity on the cathode side.

Figure 2:
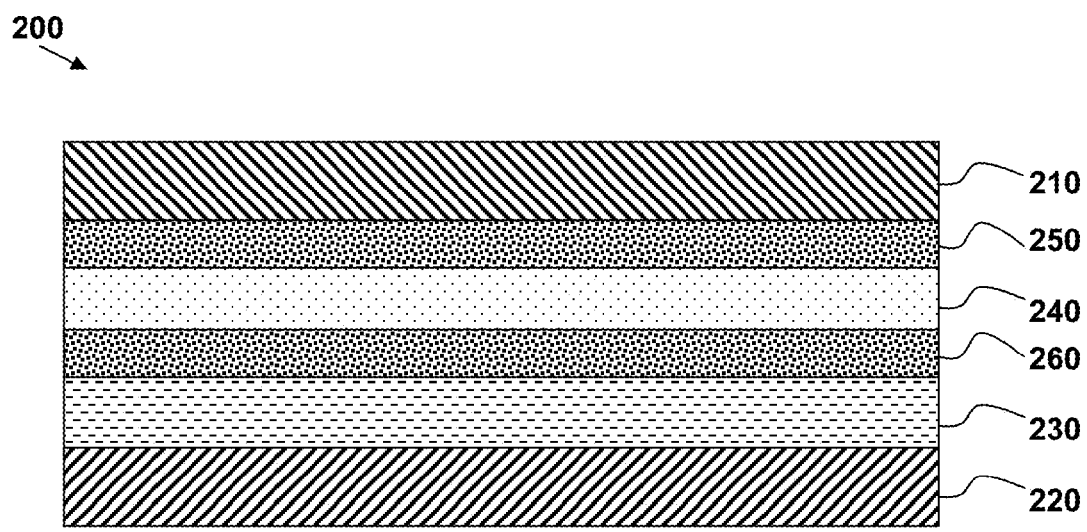
FIG. 2 is a schematic of an inorganic barrier layer coated on both sides of a substrate in the battery cell structure configuration of some embodiments.

Some embodiments of the invention relate to the lithium-ion cell structure depicted in FIG. 2. The multilayer configuration 200 includes a sulfur cathode 210, a lithium anode 220, a separator 230, a substrate 240, and two inorganic barrier layers 250, 260 coated on each side of the substrate 240. One inorganic barrier layer 250 is in direct contact with the sulfur cathode 210. These embodiments provide an additional layer of protection and may be well-suited for use in cells that will be under large amounts of mechanical stress during cycling, or that are intended to be cycled for extended periods of time. Including two inorganic barrier layers means that even if one of the inorganic barrier layers fails (e.g., due to cracks), the other inorganic barrier layer can still prevent polysulfides from reaching the anode side.

Figure 3:
FIG. 3 is a schematic of an inorganic barrier layer coated on one side of a substrate in the battery cell structure configuration of some embodiments.

Some other embodiments relate to the lithium-ion cell structure depicted in FIG. 3. The multilayer configuration 300 includes a sulfur cathode 310, lithium anode 320, a separator 330, a substrate 340, and an inorganic barrier layer 350. In FIG. 3, the inorganic barrier layer 350 is isolated from both the anode 320 and the cathode 310. The separator 330 may be a traditional battery separator material, such as Celgard® 3500.

Figure 4:
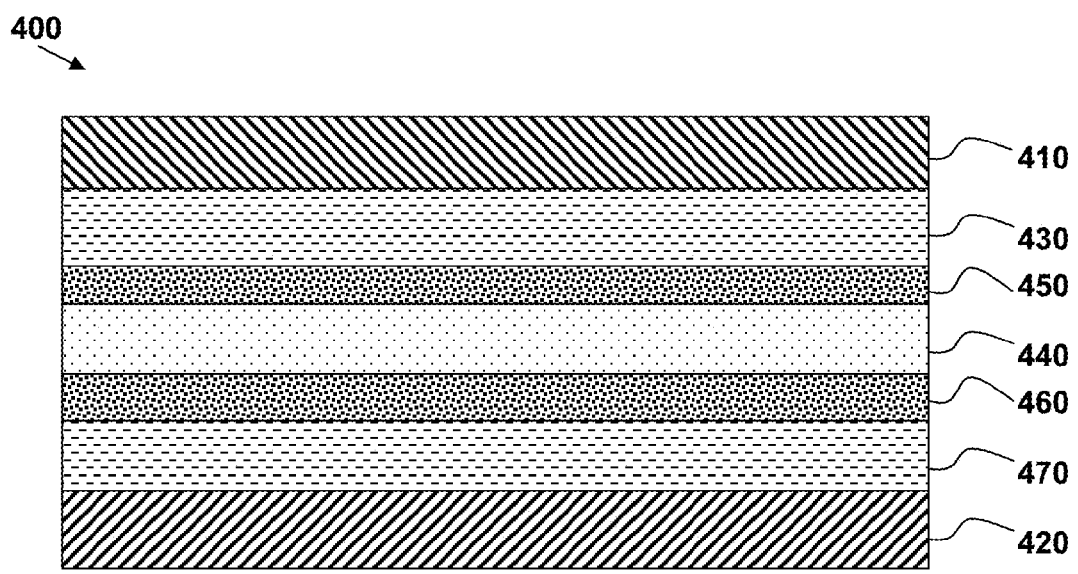
FIG. 4 is a schematic of an inorganic barrier layer coated on both sides of a substrate in the battery cell structure configuration of certain embodiments.

The lithium-ion cell structure of FIG. 3 may be modified to include a double-sided inorganic barrier layer, such as shown in FIG. 4. The multilayer configuration 400 includes a sulfur cathode 410, a lithium anode 420, two separators 430, 470, a substrate 440, and two inorganic barrier layers 450, 460 coated on each side of the substrate 440. The first inorganic barrier layer 450 is facing the first separator 430 (cathode side), and the second inorganic barrier layer 460 is facing the second separator 470 (anode side). In FIG. 4, each of the inorganic barrier layers 450, 460 is isolated from both the anode 420 and the cathode 410. Each of the inorganic barrier layers may be the same composition, although that is not necessary. Also, the two separators may be the same or different types of separators, in various embodiments.

Figure 5:
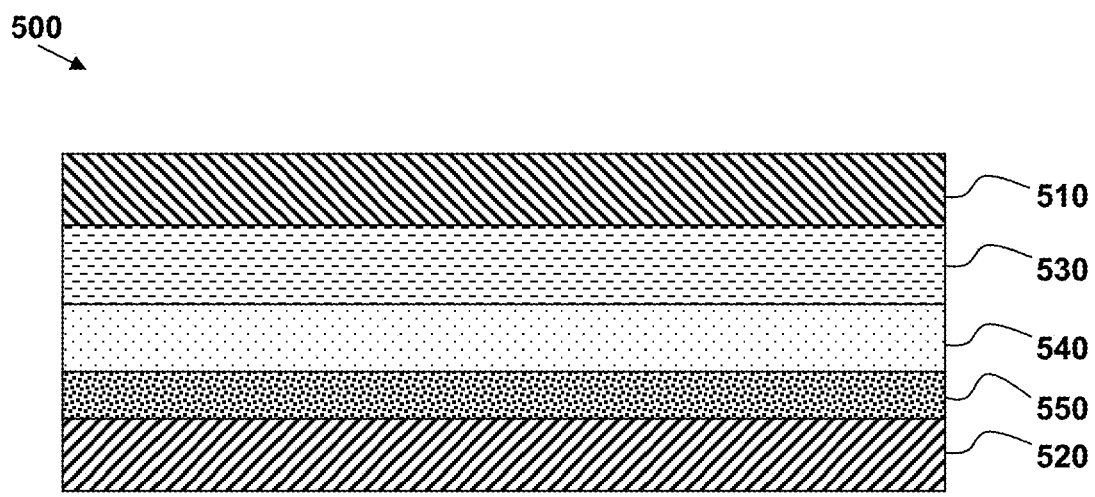
FIG. 5 is a schematic of an inorganic barrier layer coated on one side of a substrate in the battery cell structure configuration of some embodiments.

Some embodiments of the invention relate to the lithium-ion cell structure depicted in FIG. 5. The multilayer configuration 500 includes a sulfur cathode 510, a lithium anode 520, a separator 530, a substrate 540, and an inorganic barrier layer 550. The inorganic barrier layer 550 material, such as $V_2O_5$, is placed in direct contact with the lithium anode 520. The substrate 540 material, such as Celgard® 3300, is facing the separator 530 which, in turn, is facing the sulfur cathode 510. These embodiments may suppress the formation of dendrites on the lithium anode 520.

Certain embodiments of the invention are premised on the realization that one side of the separator may serve as an effective substrate for the inorganic barrier layer. That is, it is not necessary that a distinct substrate layer be present, if at least one side of the separator layer can function as, or be modified to function as, a substrate. Stated another way, in some embodiments a substrate may function as a separator, without the need for an additional separator layer.

Figure 6:
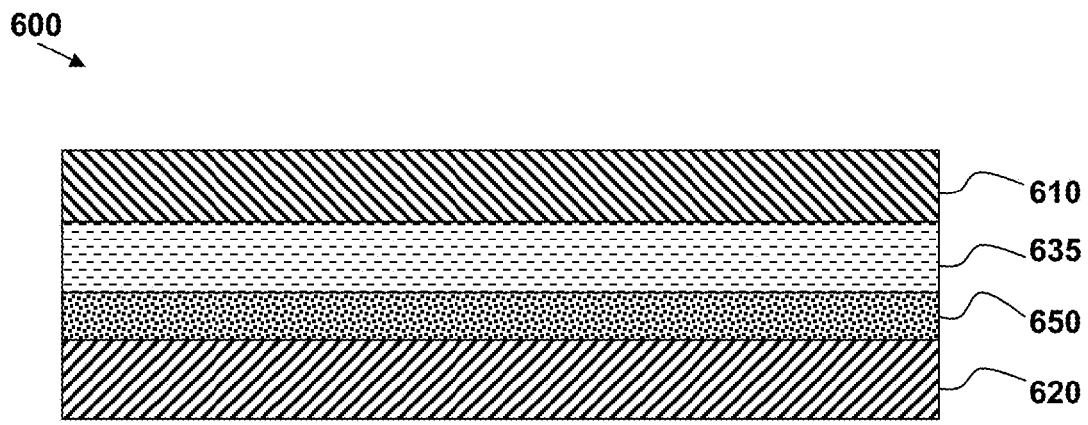
FIG. 6 is a schematic of an inorganic barrier layer coated on one side of a separator, which also serves as a substrate, in the battery cell structure configuration of certain embodiments of the invention.

Some embodiments of the invention relate to the lithium-ion cell structure depicted in FIG. 6. The multilayer configuration 600 includes a sulfur cathode 610, a lithium anode 620, a separator 635 (which also serves as a substrate), and an inorganic barrier layer 650. The inorganic barrier layer 650 material, such as $V_2O_5$, is placed in direct contact with the lithium anode 620. The separator 635 is facing the sulfur cathode 610. These embodiments may suppress the formation of dendrites on the lithium anode.

The battery cell configurations described above are not limited to any particular method to fabricate an inorganic barrier layer or layers. Certain methods provided by some variations of the invention may be useful. In some embodiments, an inorganic barrier layer is formed by sol-gel synthesis (such as described in Example 3) or by vapor deposition directly onto a substrate or onto a cell separator (such as described in Example 4).

In some variations, the invention provides a method of fabricating a lithium-based battery cell, the method comprising disposing a lithium-ion-conducting inorganic barrier layer between a lithium-containing anode and a cathode by sol-gel synthesis.

The sol-gel process, also known as chemical-solution deposition, is a well-known wet-chemical technique to fabricate a metal oxide starting from a chemical solution (or "sol") that acts as the precursor for an integrated network (or "gel"). Typical precursors are metal alkoxides and metal chlorides, which undergo various forms of hydrolysis and polycondensation reactions. The precursor sol can be deposited on a substrate to form a film by any known technique, including (but not limited to) dip coating, spin coating, spraying, electrophoresis, inkjet printing, or roll coating. The sol gradually evolves towards the formation of a gel-like diphasic system containing both a liquid phase and solid phase whose morphologies range from discrete particles to continuous polymer networks. Removal of the remaining liquid (solvent) phase requires a drying process, which may be accompanied by a significant amount of shrinkage and densification.

Sol-gel synthesis in some embodiments of the present invention may include the steps of forming a sol-gel comprising a selected inorganic compound, or a precursor thereof; applying, by dip-coating, a sol-gel layer comprising the sol-gel to an optionally surface-modified substrate, and then drying the sol-gel layer, to form the inorganic barrier layer comprising the selected inorganic compound. The surface-modified substrate may be prepared by exposing the substrate to an oxygen plasma source to etch the surface and improve adhesion of the sol-gel. Other means of etching the surface may be applied. Alternatively, or additionally, an adhesive layer may be applied to the surface, to enhance adhesion of the sol-gel. Preferably, oxygen-free and moisture-free conditions are maintained while introducing the inorganic barrier layer into the battery cell.

Some embodiments employ dip-coating to coat a sol-gel layer into a substrate. An exemplary dip-coating process includes immersing a substrate into a solution of the coating material at a constant speed (preferably jitter-free); pulling up the substrate and allowing a thin layer to deposit itself on the substrate while it is pulled up, wherein the speed determines the coating thickness (faster withdrawal achieves thicker coatings); draining excess liquid from the surface; and evaporating solvent to form a thin layer.

Some embodiments employ spin-coating to coat a sol-gel layer into a substrate. Spin coating is a process used to apply uniform thin films to flat substrates. An exemplary spin-coating process includes placing excess solution on a substrate, which is then rotated at high speed in order to spread the fluid by centrifugal force. Rotation is continued while the fluid spins off the edges of the substrate, until the desired thickness of the film is achieved. The applied solvent is typically volatile, and simultaneously evaporates. The higher the angular speed of spinning, the thinner the film. The thickness of the film also depends on the concentration of the solution and the solvent.

In some variations, the invention provides a method of fabricating a lithium-based battery cell, the method comprising disposing a lithium-ion-conducting inorganic barrier layer between a lithium-containing anode and a cathode by vapor deposition. Vapor deposition may be preferable when relatively thin inorganic barrier layers are desired, or for other reasons.

Vapor deposition includes various methods to deposit thin films by the condensation of a vaporized form of a material onto a surface. Vapor deposition generally includes chemical vapor deposition and physical vapor deposition; physical vapor deposition is preferred for the present invention (although chemical vapor deposition, or mixed chemical-physical vapor deposition, may certainly be used). Vapor deposition may include high-temperature vacuum evaporative deposition, plasma sputter bombardment, direct-current sputter deposition, cathodic arc deposition, electron beam vapor deposition, pulsed laser deposition, or any combination thereof.

The vapor deposition, in some embodiments, is pulsed direct-current sputter deposition, comprising the steps of impacting a sputtering source of a selected inorganic compound, or a precursor thereof, with a sputtering gas under vacuum to form the inorganic barrier layer on a substrate. In some embodiments, the sputtering source comprises a selected metal, the sputtering gas comprises an oxidant that converts the selected metal to a metal oxide, and the inorganic barrier layer comprises the metal oxide. Vapor deposition may form an inorganic barrier layer having high crystallinity, which may help the layer to be structurally rigid and continuous. Preferably, oxygen-free and moisture-free conditions are maintained while introducing the inorganic barrier layer into the battery cell.

The inorganic barrier layer should be lithium-ion-conducting, i.e., permeable to lithium ions ($Li^+$). In various embodiments, the lithium-ion conductivity of the inorganic barrier layer is from $10^{-5}$ to $10^{-2}$ S/cm, preferably from $10^{-3}$ to $10^{-2}$ S/cm. Preferably, the inorganic barrier layer is not appreciably permeable to any other chemical species. A "chemical species" means an atom, molecule, or particle comprising at least one proton.

The inorganic barrier layer should not contain large pores, such as an average pore size of greater than 1 micron. That is, pores should not be available for chemical species to pass through the inorganic barrier layer directly (i.e., by simple pore diffusion or convection). If there are minor structural defects in the inorganic barrier layer introduced during battery manufacturing or operation, small amounts of chemical species (other than $Li^+$) can be expected to pass through the layer by convection through the defects, without departing from the scope of the invention.

An inorganic barrier layer may also be electronically conductive in addition to providing good lithium-ion conductivity. In various embodiments, the electronic conductivity of the inorganic barrier layer is from $10^{-2}$ to $10^2$ S/cm, such as from $10^{-1}$ to 1 S/cm.

As will be appreciated by skilled artisans, the flexibility to select electronically conductive materials for the inorganic barrier layer opens up classes of materials that would not be preferred if electronic conductivity needed to be minimized. For example, anode and cathode materials can be implemented as the inorganic barrier layer. Known lithium-ion conductors tend to have low conductivities (~$10^{-6}$ S/cm). The ionic conductivity of battery electrode materials can reach at least $10^{-3}$ S/cm due to the orders-of-magnitude higher mobile lithium-ion concentration in the solid phase.

One advantage to high Li-ion conductivity (i.e., up to about $10^{-2}$ S/cm) is that the inorganic barrier layer does not need to be extremely thin, although it certainly can be thin if desired. When the inorganic barrier layer is relatively thick, structural rigidity is provided so that the inorganic barrier layer need not rely on either the anode or cathode for structural support.

In preferred embodiments, the inorganic barrier layer is "structurally rigid and continuous" which means that it is mechanically self-supporting in the presence of active battery materials, and that the inorganic barrier layer forms a coating on the substrate that covers the entire area through which active battery materials may be conveyed. During extended operation (battery charge or discharge), a structurally rigid and continuous inorganic barrier layer is expected to maintain good efficiency because it will not easily leak, crack, or otherwise deform. The absence of discontinuities in a continuous inorganic barrier layer means that reaction products (e.g., polysulfides or lithium dendrites) cannot propagate through the inorganic barrier layer.

The substrate for the inorganic barrier layer may be any suitable substrate material that can serve as a template or surface for the formation of a selected inorganic barrier layer. A preferred substrate is a polyolefin, such as polyethylene, polypropylene, polybutylene, or combinations thereof. A preferred separator is also a polyolefin, such as polyethylene, polypropylene, polybutylene, or combinations thereof (e.g., Celgard® separators, Celgard LLC, Charlotte, N.C., US).

Again, it is possible for the separator layer to provide the surface for formation of the inorganic barrier layer (e.g., FIG. 6), or there may be a separate substrate as shown in FIGS. 1-5, or there may be a distinct substrate for one inorganic barrier layer while the separator provides a surface for a second inorganic barrier layer, and so on.

The principles of the invention can be applied to a wide variety of commercially important lithium-based battery systems.

Lithium-sulfur batteries have theoretical energy densities of 2500 Wh/kg (watt-hours per kilogram), in contrast to 560 Wh/kg for lithium-ion batteries. Commercialization of lithium-sulfur batteries has been hindered by technical difficulties. When a sulfur electrode is discharged, it forms a series of polysulfides that are soluble in common battery electrolytes. The dissolved compounds can migrate to the lithium electrode, effectively creating an internal short mechanism with greatly reduced energy efficiency. Metal lithium forms dendrites during repeated cycling due to non-uniform dissolution and deposition. These dendrites are highly reactive with electrolytes and can even penetrate the separator to create internal shorting. The inorganic barrier layer provided by the present invention, by allowing passage of lithium ions but no other chemical species, can effectively shut down these internal shorting mechanisms.

Figure 7:
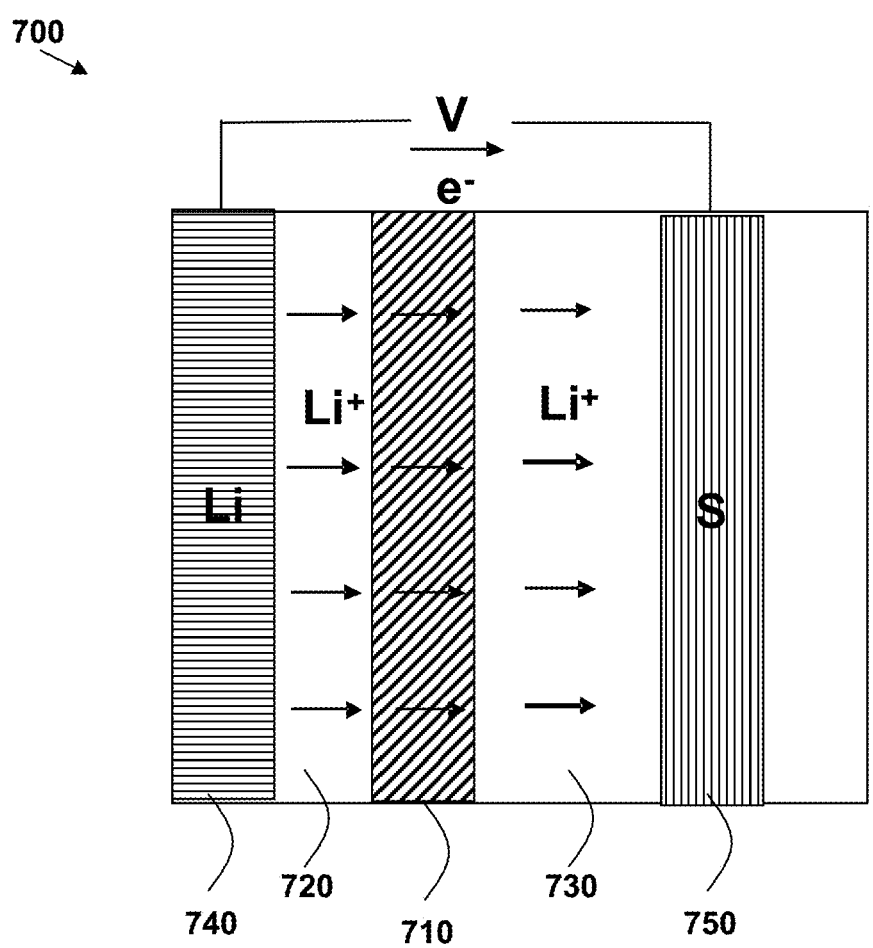
FIG. 7 depicts a lithium-sulfur battery with a lithium metal oxide layer as part of the separator, according to some embodiments of the invention.

FIG. 7 depicts a lithium-sulfur battery structure 700 employing an inorganic barrier layer. In a normal lithium-sulfur battery, a porous polymer separator is sandwiched between lithium and sulfur electrodes and soaked with liquid electrolyte. In FIG. 7, the separator consists of three layers—lithium metal oxide as the middle layer (inorganic barrier layer 710), sandwiched by a porous material (e.g., a polymer) in the outer layers 720, 730. The lithium metal oxide layer exclusively allows lithium ions to pass through from the lithium anode 740 to the sulfur cathode 750.

The composition of the inorganic barrier layer 710 can be selected from any battery anode or cathode materials. In some embodiments, the composition includes one or more of materials selected from the group consisting of $VO_x$ ($x \leq 2.5$), $MnO_x$ ($x \leq 2$), $Li_xMn_2O_4$ ($0 \leq x \leq 2$), $Li_xCoO_2$ ($0 \leq x \leq 1$), $Li_xTiO_2$ ($0 \leq x \leq 1$), $Li_{3+x}Ti_5O_{12}$ ($0 \leq x \leq 4$), $Li_xTiS_2$ ($0 \leq x \leq 1$), $Li_xNiO_2$ ($0 \leq x \leq 1$), $Li_xV_2O_y$ ($0 \leq x \leq 5$, $4 \leq y \leq 5$), $Li_xWO_3$ ($0 \leq x \leq 0.5$), $Li_xNb_2O_5$ ($0 \leq x \leq 3$), $Li_xFePO_4$ ($0 \leq x \leq 1$), $Li_xCoPO_4$ ($0 \leq x \leq 1$), $Li_xVPO_4$ ($0 \leq x \leq 1$), and combinations thereof.

The inorganic barrier layer may be fabricated from a powder precursor, in some embodiments. The powder may be mixed with a polymer binder (such as polyvinylidene fluoride, PVDF) dissolved in a suitable solvent. The slurry may be cast into tapes. After drying, the tapes may be hot-pressed at a temperature above the melting point of the polymer so that porosity can be eliminated.

The inorganic barrier layer may be further laminated with two porous layers to form a composite separator. These porous layers are preferably electronically resistive to help prevent an electrical short circuit. The porous layers may be fabricated from any material that is suitable as a normal separator layer known in the art. Examples include olefin polymers (e.g., polyethylene or polypropylene), fluorine-containing polymers, cellulose polymers (e.g., paper), polyimides, nylons, glass fibers, alumina fibers, and porous metal foils. The form of the porous layer may be a non-woven fabric, a woven fabric, a microporous film, a foil, or another configuration that may be selected for its mechanical strength or other properties, or for cost reasons.

Figure 8:
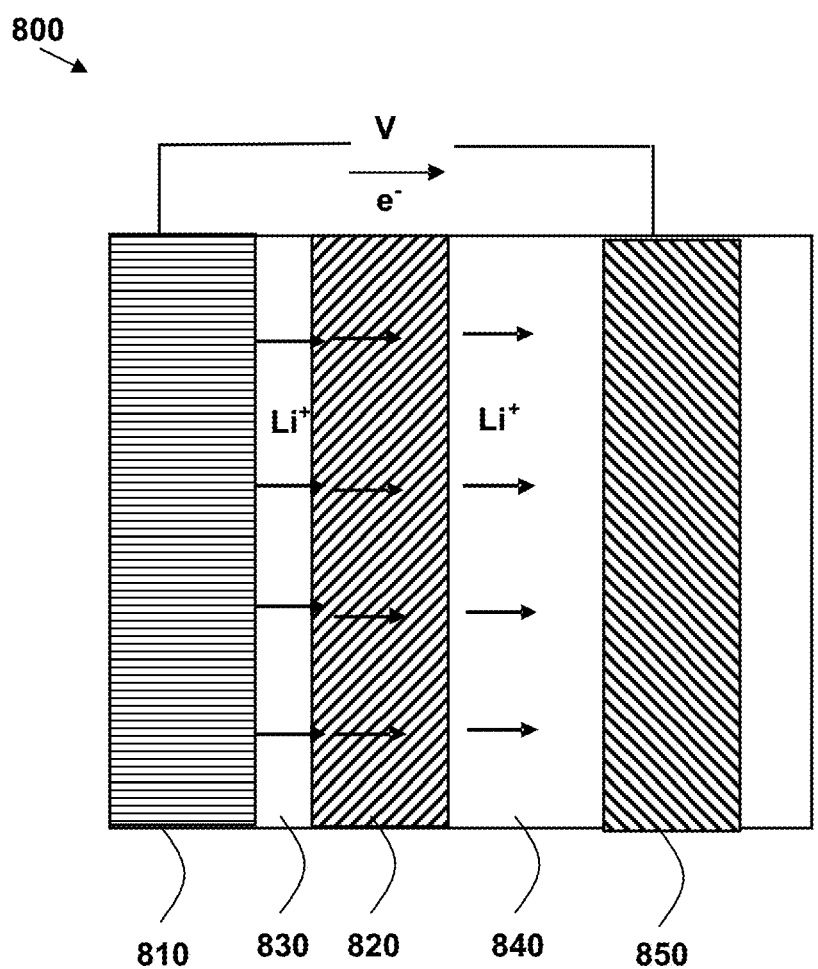
FIG. 8 depicts a lithium-ion battery employing non-porous lithium metal oxide as the battery separator, according to some embodiments.

FIG. 8 shows a lithium-ion battery structure 800 wherein a lithium metal oxide barrier layer is part of the battery separator. This battery configuration includes an anode 810, a three-layer separator comprising a lithium metal oxide barrier layer 820 sandwiched by porous layers 830, 840, and a lithium metal oxide cathode 850. The lithium metal oxide cathode 850 may be fabricated from any known cathode materials. In some preferred embodiments, the cathode 850 includes $LiMPO_4$ (M=Co, Fe, or V) and/or $LiMn_2O_4$ (or other manganese-containing compounds).

During battery storage and cycling, in particular at elevated temperatures, metal from the cathode 850 can dissolve in the battery electrolyte and, without the presence of the inorganic barrier layer 820, would migrate to the lithium-ion anode surface and lead to capacity loss. The inorganic barrier layer 820 blocks such migration, thus extending the lithium-ion battery's life.

Lithium-air batteries generally use porous cathodes to catalyze the reduction of oxygen. These batteries have a theoretical energy density of 5220 Wh/kg and have significant potential because atmospheric air may be utilized at low cost and high availability. A major technical challenge associated with lithium-air batteries known in the art is the chemical corrosion of lithium due to moisture from the ambient atmosphere.

The inorganic barrier layer described herein is effective for separating the lithium electrode from the ambient atmosphere, thereby reducing the influence of moisture and extending the battery's life. When an inorganic barrier layer is present, a non-aqueous reaction involving lithium is paired with a reaction involving oxygen. The inorganic barrier layer prevents water from contaminating the anode side of the battery. A non-aqueous environment for lithium is important because lithium reacts intensely with water, forming lithium hydroxide and flammable hydrogen.

Figure 9:
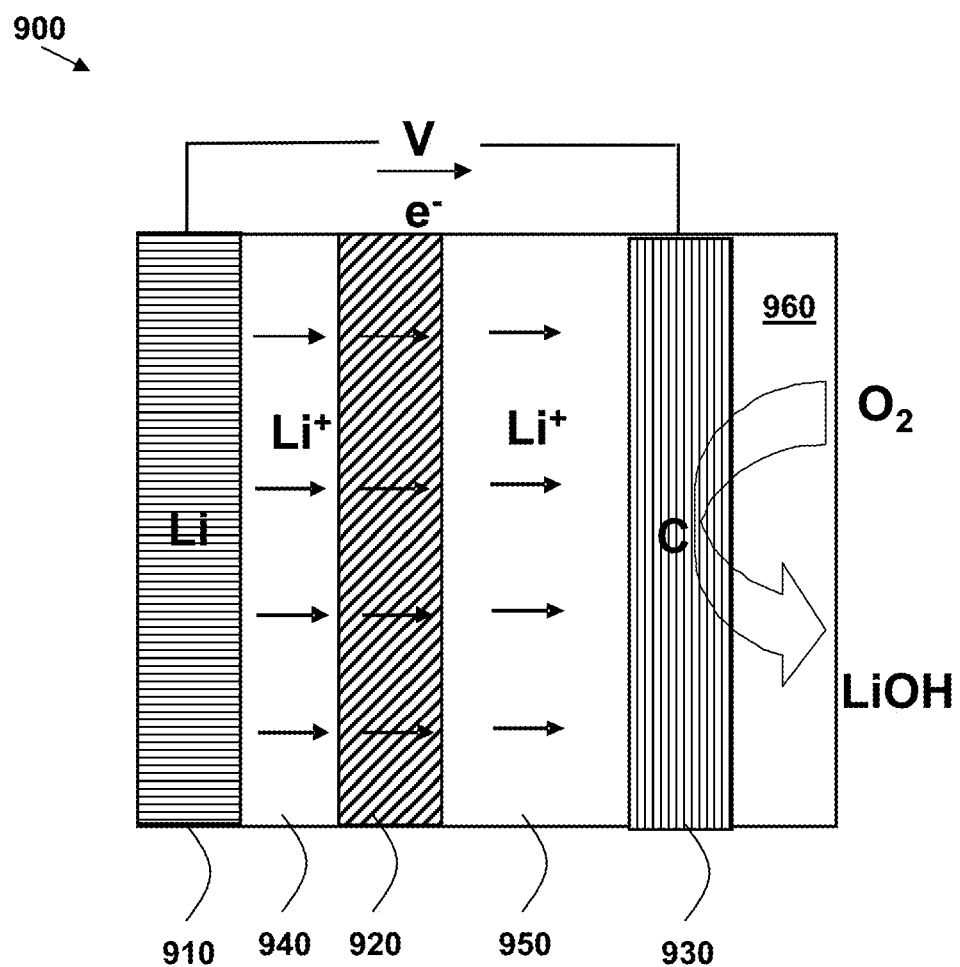
FIG. 9 depicts a lithium-air battery that includes an aqueous solution for oxygen reduction at the cathode, according to some embodiments.

FIG. 9 depicts an exemplary lithium-air battery structure 900 with an aqueous solution for oxygen reduction. The configuration includes an anode 910, a cathode 930, porous polymer separator layers 940, 950, and an inorganic barrier layer 920 which may be, for example, lithium metal oxide. The inorganic barrier layer 920 allows water to be utilized as a solvent on the right-hand side (960). Water is a preferred solvent in some embodiments because oxygen reduction in aqueous media is faster than in non-aqueous media. Additionally, water can dissolve $Li_2O$ to form LiOH. This conversion may prevent passivation of the cathode 930 surface and increase battery power. In some embodiments, a porous carbon electrode 930 is supported with platinum or nickel oxide catalyst. The aqueous solution 960 includes 1-5 M KOH. Oxygen reduction generates $OH^-$ anions. The net battery reaction is: $4 Li+O_2+2 H_2O=4 LiOH$.

In some embodiments relating to FIG. 9, a non-aqueous solution 960 is employed for oxygen reduction on the cathode side. When reacting oxygen with lithiated metal oxide (i.e., a metal oxide containing lithium) and in the absence of water, oxygen can form lithium peroxide, $Li_2O_2$, which may be reversibly charged. In these embodiments, the inorganic barrier layer 920 prevents water from reaching lithium.

The possible composition and methods of fabrication for the inorganic barrier layer 920 of FIG. 9 are similar to those described above with reference to FIG. 7. The redox potential of lithium insertion into the inorganic barrier layer should be close (by appropriate selection of the composition) to the redox potential of oxygen reduction, which is between 2-3 volts versus Li. Amorphous vanadium oxide is preferred, since its potential continuously varies with the insertion of lithium.

Figure 10:
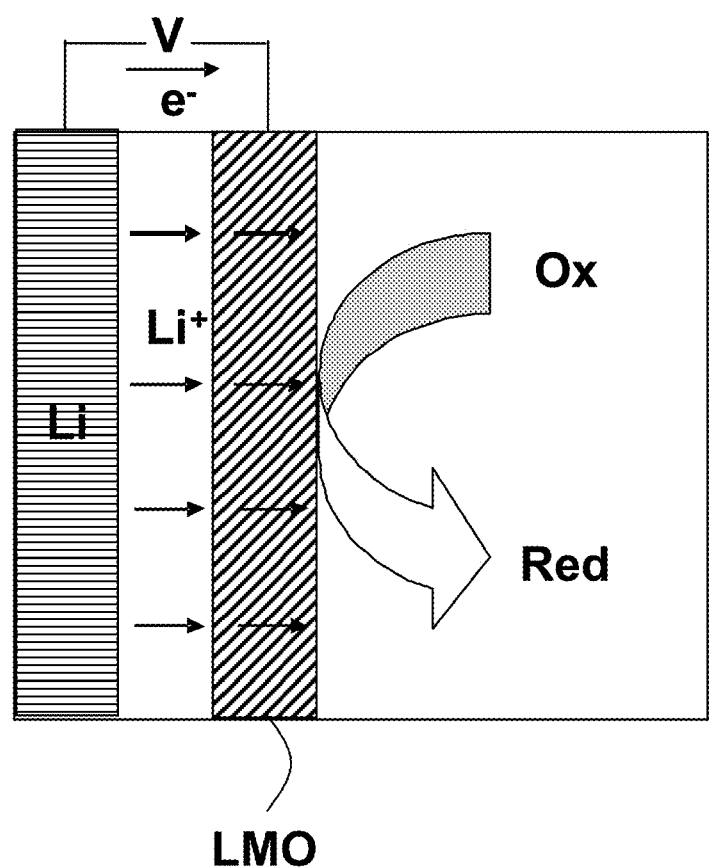
FIG. 10 illustrates a generalized scheme of various embodiments of the invention, wherein the battery reaction utilizes an oxidant capable of reacting with lithium metal oxide to form a reductant.

Other embodiments are premised on the realization that a lithium metal oxide barrier layer may be used to assist an overall chemical reaction at the cathode side, as follows. The generalized scheme shown in FIG. 10 illustrates that any oxidant (Ox) capable of reacting with lithium metal oxide (LMO) may be used for the battery reaction to form the reductant (Red). The cathode may include any liquid or gas that is capable of reacting with lithium metal oxide in a certain voltage range. This scheme may be referred to as implementing an assisted cathode. As used herein, an "assisted cathode" is a combination of a lithium metal oxide layer and a cathode-side fluid. Any fluid (liquid or gas) that can react with lithium metal oxide may be used in the assisted cathode, since the LMO layer only allows the passage of lithium ions and electrons, but nothing else. Exemplary cathode fluids include, but are not limited to: $O_2$, $Br_2$, $SO_2$, $SOCl_2$, $SO_2Cl_2$, and $I_2$. Various inert diluents may be present, such as nitrogen ($N_2$).

Figure 11:
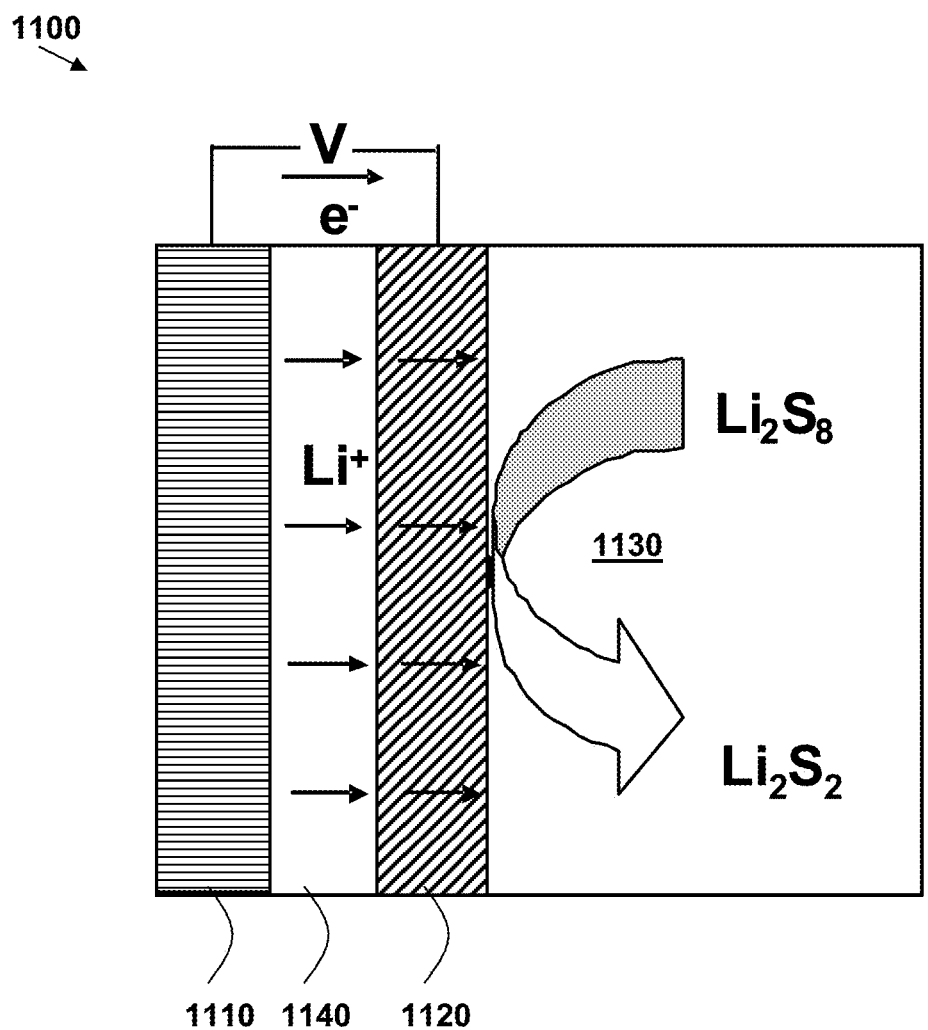
FIG. 11 depicts a lithium-ion battery with a non-porous lithium metal oxide layer on the cathode side, at which lithium polysulfide can react with lithium metal oxide to consume lithium and reduce polysulfide, according to some embodiments.

FIG. 11 depicts a specific lithium-ion battery 1100 that incorporates an assisted cathode (1120, 1130). In this particular design, an anode 1110 comprising Li metal or lithiated carbon ($Li_xC_6$), a lithium metal oxide barrier layer 1120, and a separator 1140 form a battery structure wherein the inorganic barrier layer 1120 assists the overall chemical reaction at the cathode side. On the back side of the oxide electrode (not exposed to the electrolyte) is a solution 1130 of lithium polysulfide dissolved in sulfolane. Lithium polysulfide reacts with the lithium metal oxide to consume lithium. During battery discharge, lithium is removed from the anode 1110 and inserted into the oxide electrode (inorganic barrier layer 1120), causing its potential to drop. $Li_2S_8$ will react with the oxide once its potential drops below its reduction potential. This process may continue until all $Li_2S_8$ is consumed. During battery charging, the reverse process takes place. The net battery reaction is the reduction of the polysulfide, which can be represented with the overall chemical reaction $Li_2S_8+6 Li=4 Li_2S_2$ where the Li is derived from the lithium metal oxide barrier layer material. The inorganic barrier layer 1120 effectively serves as a reaction mediator. This battery structure prevents sulfur crossover and makes use of long-cycling lithiated carbon as the anode.

The possible composition and methods of fabrication for the inorganic barrier layer 1120 in FIG. 11 are similar to those described above with reference to FIG. 7, except that the redox potential of lithium insertion into the lithium oxide layer is preferably lower than that of lithium addition to $Li_2S_8$. The reason for this preference is so that during battery discharge, $Li_2S_8$ spontaneously reduces the lithium metal oxide by removing electrons and lithium ions. The potential difference, however, should be as small as possible to minimize energy loss to heat (due to exothermic enthalpy of reaction).

The battery voltage is determined by the potential difference between the inorganic barrier layer 1120 and anode 1110, not between $Li_2S_8$ and the anode. Since the polysulfide reactions ($Li_2S_8 \rightarrow Li_2S_6 \rightarrow Li_2S_4 \rightarrow Li_2S_3 \rightarrow Li_2S_2$) take place at an average voltage of 2.0 V, it is preferred that the selected inorganic barrier layer material can be reversibly discharged to this region. More preferably, a material with no clear plateau is employed since the voltage continuously decreases until the reaction with polysulfide commences. Some preferred embodiments employ amorphous vanadium oxide, such as $Li_xV_2O_y$, (wherein 0<x<5, 4<y<5).

In some embodiments, a plurality (two or more) of inorganic barrier layers are used in an overall structure. For example, a first inorganic barrier layer (such as lithium metal oxide, but not so limited) may be used within a composite separator layer, while a second inorganic barrier layer is employed at the cathode side to assist the net cathode chemistry, i.e. serve as a reaction mediator. The composition, thickness, and other physical or chemical properties of the first and second inorganic barrier layers, or more layers if desired, may be the same or different.

Battery structural features applicable to variations of the invention will now be further described, again without limiting the invention's scope in any way.

The cathode material preferably exhibits long cycle life and calendar life. The material may be, for example, a lithium metal oxide, phosphate, silicate, or sulfur. Exemplary cathode materials suitable for the present invention include, but are not limited to, sulfur, lithium-sulfur compounds, $LiMO_2$ (M=Co, Ni, Mn, or combinations thereof); $LiM_2O_4$ (M=Mn, Ti, or combinations thereof); $LiMPO_4$ (M=Fe, Mn, Co, or combinations thereof); and $LiM_xM'_{2-x}O_4$ (M, M'=Mn or Ni). In some embodiments, the cathode includes sulfur that is present in connection with carbon nanostructures, such as carbon nanotubes or other structures with a characteristic dimension in the range of about 1 nm to 100 nm. A nanostructured sulfur cathode may enhance sulfur utilization and mitigate sulfur redistribution.

The anode material preferably exhibits long cycle life and calendar life. Exemplary anode materials suitable for the present invention include, but are not limited to, carbon materials such as graphite, coke, soft carbons, and hard carbons; and metals such as Si, Al, Sn, or alloys thereof. Other exemplary anode materials include titanium oxides, germanium, copper/tin, and lithium compounds containing metal oxides, such as oxides of W, Fe, and Co.

In some embodiments, the anode material consists essentially of graphitic carbon or another electron-conducting carbon. Some examples of electron-conducting carbon include natural graphites, such as flaky graphite, plate-like graphite, and other types of graphite; high-temperature sintered carbon products obtained, for example, from petroleum coke, coal coke, celluloses, saccharides, and mesophase pitch; artificial graphites, including pyrolytic graphite; carbon blacks, such as acetylene black, furnace black, Ketjen black, channel black, lamp black, and thermal black; asphalt pitch, coal tar, active carbon, mesophase pitch, and polyacetylenes.

The anode, cathode, and/or the inorganic barrier layer may further comprise one or more conductive fillers to provide enhanced electronic conductivity. Examples of conductive fillers include, but are not limited to, conductive carbons, graphites, activated carbon fibers, non-activated carbon nanofibers, metal flakes, metal powders, metal fibers, carbon fabrics, metal mesh, and electrically conductive polymers. The anode, cathode, and/or the inorganic barrier layer may also further comprise other additives such as, for example, alumina, silica, and transition-metal chalcogenides.

The anode, cathode, and/or the inorganic barrier layer may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, polytetrafluoroethylenes, polyvinylidene fluorides, ethylene-propylene-diene rubbers, polyethylene oxides, acrylates, methacrylates, divinyl ethers, and the like.

Electrolytes generally include a solvent and a lithium salt (anion plus lithium cation). Lithium salts include, but are not limited to, $LiClO_4$, $LiBF_4$, $LiPF_6$, $LiCF_3SO_3$, $LiCF_3CO_2$, $LiAsF_6$, $LiSbF_6$, $LiAlCl_4$, $LiCl$, $LiBr$, and $LiI$, which may be used alone or as a mixture of two or more. $LiBF_4$ and $LiPF_6$ are preferable, in some embodiments. The concentration of the salt is not particularly limited, but preferably is about 0.1 to 5 mol/L of the electrolytic solution.

Examples of electrolyte solvents include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones. As is known, minor components and impurities may be present in the electrolyte.

Current collectors collect electrical current generated and provide an efficient surface for attachment of the electrical contacts leading to the external circuit. Current collectors may be made from any suitable materials, such as (but not limited to) Al, Cu, Ni, or Au. The current collectors may also be fabricated from alloys, such as stainless steel.

Physically, the current collectors may be thin foils, such as foils with thicknesses in the 5-50 μm range. Other configurations that may be used for the current collectors include metal meshes, metal nets, perforated metal, metallized plastic films, metal grids, expanded metal grids, metal wools, woven carbon fabrics, woven carbon meshes, non-woven carbon meshes, and carbon felts.

A battery can be packaged into either prismatic format cells or cylindrical cells, for example. In the prismatic format, the stacked structure is preferably sealed with a packaging material capable of preventing air and water contamination of the battery.

Lithium-based batteries (e.g., lithium-ion, lithium-sulfur, or lithium-air batteries) can be included in a battery pack, which includes a plurality of electrochemical cells that are electrically connected in series and/or in parallel. These battery packs come in many shapes, sizes, capacities, and power ratings, depending on the intended use of the battery pack. Battery packs will typically include a thermal-management system.

Lithium-based batteries according to this invention are suitable for operating across a variety of temperature ranges. Exemplary operation temperatures may be from −50° C. to 80° C., such as for military applications. For computers and related devices, as well as for electric-vehicle applications, temperatures from −30° C. to 60° C. are possible.

Example 1

Figure 12A:
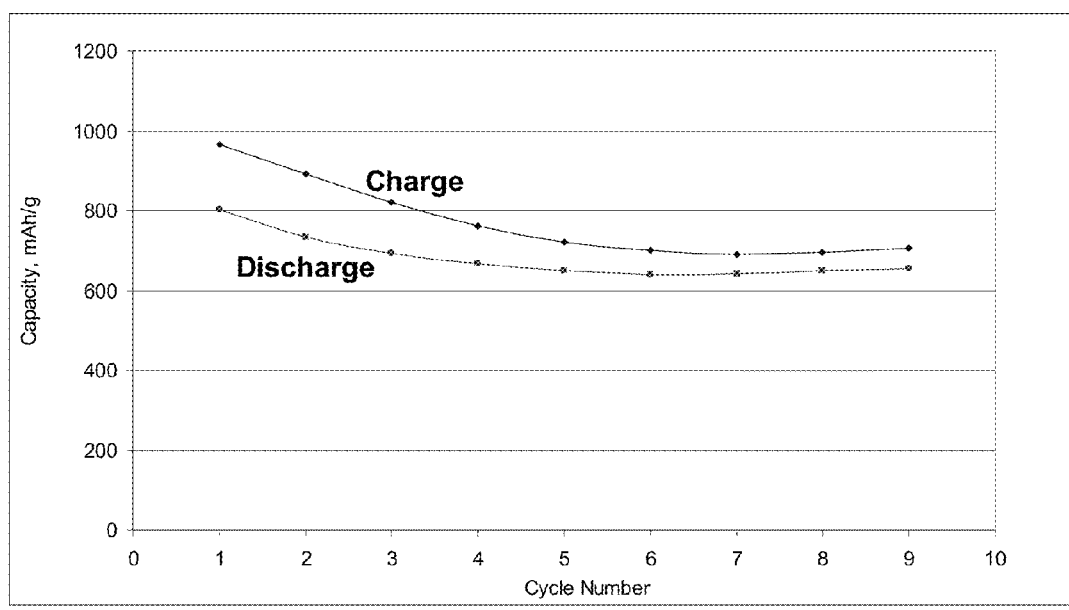
FIG. 12A shows charge and discharge capacity data, normalized to the mass of sulfur in the cell, for Example 1 herein.
Figure 12B:
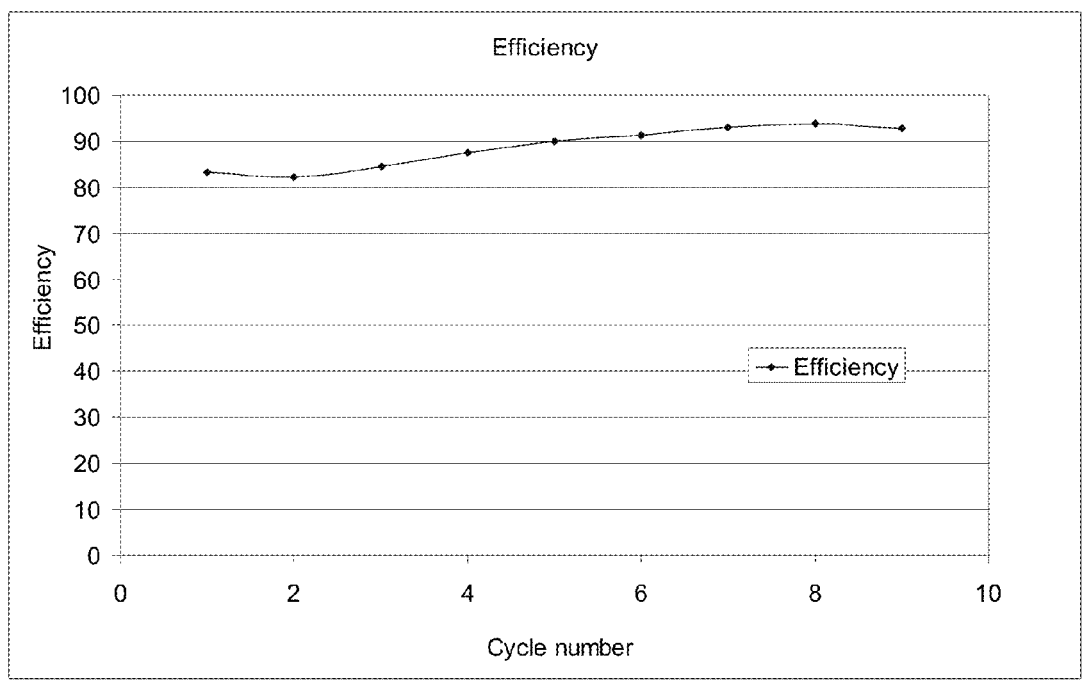
FIG. 12B depicts cycling efficiency for the data shown in FIG. 12A.

A lithium-sulfur cell configuration as described in the specification and assembled in accordance with FIG. 1 is tested for cycling stability. FIG. 12A shows charge and discharge capacity data, normalized to the mass of sulfur in the cell. FIG. 12B shows the cycling efficiency for the data shown in FIG. 12A. The surprisingly high (exceeding 90%) cycling efficiency demonstrates the effectiveness of an inorganic barrier layer in limiting polysulfide crossover and maintaining stability in a cell assembled with a barrier layer.

Example 2

A lithium-sulfur cell configuration assembled in accordance with FIG. 3 is constructed with a carbon anode, a cathode comprising 60% sulfur and 10% $TiS_2$, a $V_2O_5$ inorganic barrier layer, and a Celgard separator.

Figure 13:
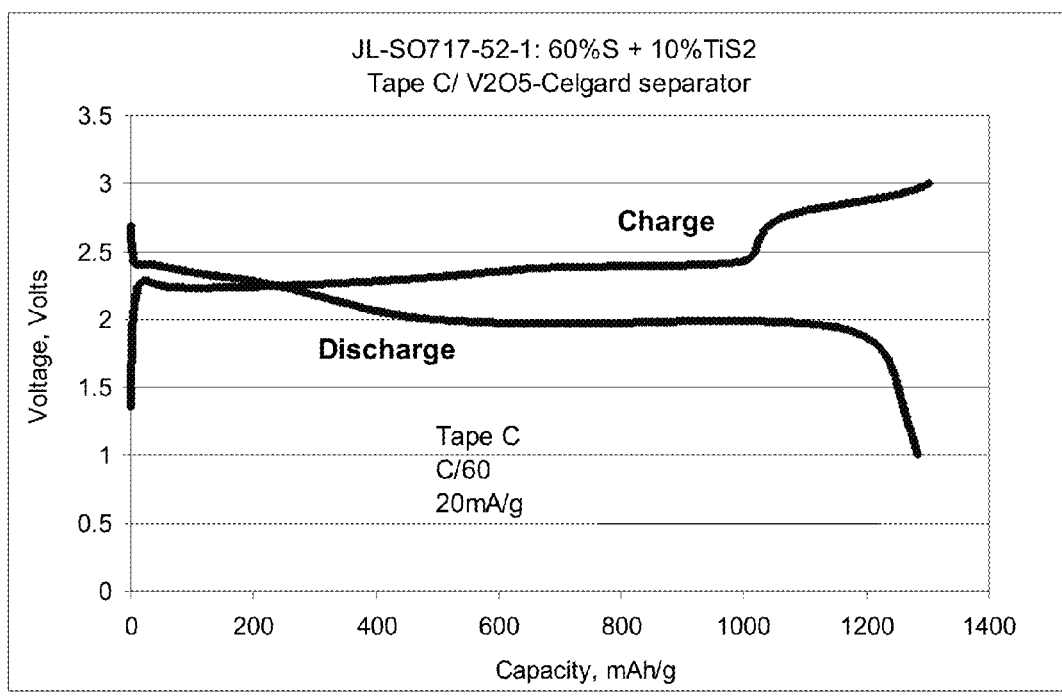
FIG. 13 shows voltage-versus-capacity charge and discharge curves for a lithium-sulfur cell according to Example 2 herein.

FIG. 13 shows voltage-versus-capacity curves for charge and discharge of the lithium-sulfur cell. The data indicates that this configuration is exceptionally effective in limiting polysulfide crossover.

Comparative Example

Figure 14:
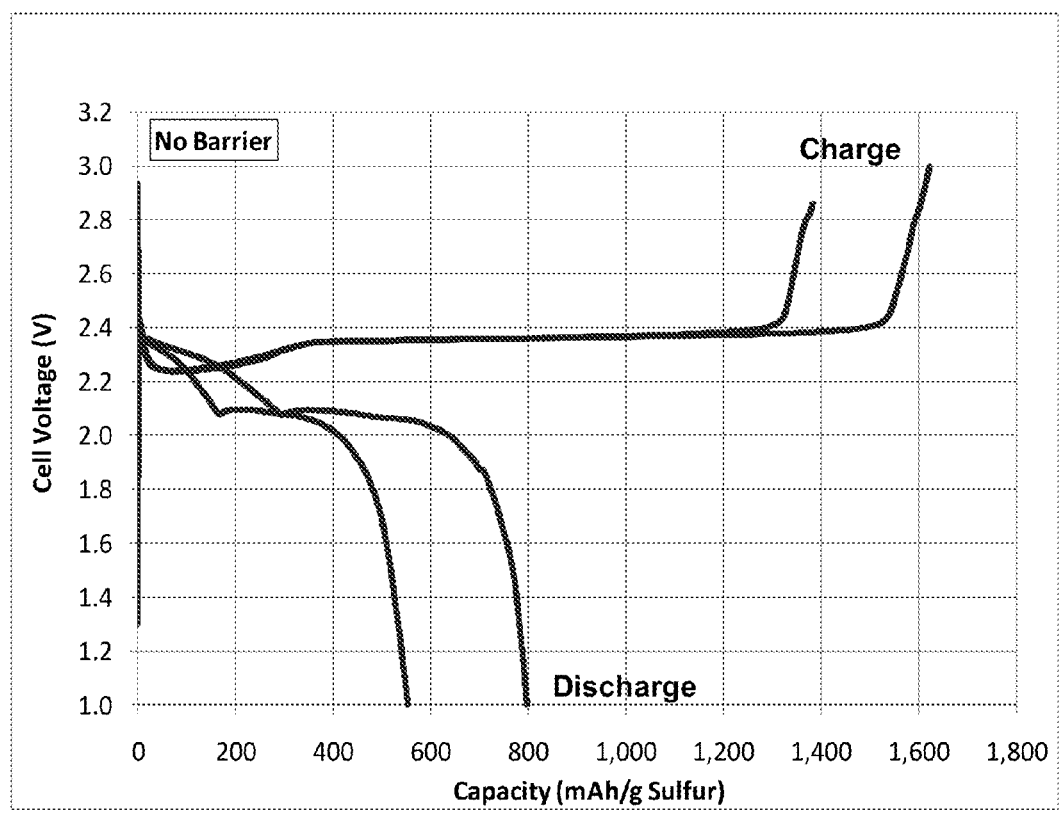
FIG. 14 shows cell voltage-versus-capacity charge and discharge curves illustrating polysulfide crossover in a battery cell assembled without an inorganic barrier layer, according to a Comparative Example.

A lithium-sulfur cell configuration with a lithium anode, sulfur cathode, and separator is assembled in accordance with the prior art, without any inorganic barrier layer. FIG. 14 shows cell voltage versus capacity, illustrating polysulfide crossover due to the absence of an inorganic barrier layer. During delithiation of the sulfur, when increasing the cell voltage from 1 V to 3 V, the cell voltage becomes stuck at about 2.4 V for an extended period of time, resulting from the continuous lithiation/delithiation of the electrolyte-soluble lithium polysulfide, as it moves between the anode and the cathode.

Example 3

In this Example 3, a sol-gel synthesis procedure is used to fabricate an inorganic barrier layer, as follows. A selected metal oxide, vanadium oxide ($V_2O_5$), is combined with hydrogen peroxide ($H_2O_2$) in water, and allowed to react in air. The peroxide is used to initiate the hydrolysis and condensation reactions that form the vanadium pentaoxide sol-gel network. The reaction is exothermic and can be tailored to generate sols of varying density, by changing the peroxide concentration, reaction time and temperature. The sol can also be processed after formation by solvent exchange to alter the sol-gel density.

After the desired sol-gel has been formed it is applied to a tri-layer polypropylene/polyethylene/polypropylene separator that has been exposed to an oxygen plasma source. The oxygen plasma source etches the surface of the separator and improves the adhesion of the sol-gel to the separator. The sol-gel is applied to the separator by dipping the separator into the sol-gel solution. The dipping procedure may be repeated to increase the film thickness, if desired. Each layer is allowed to dry in air for at least 2 hours prior to application of the next layer. After the final layer is applied, the coated separator is dried under vacuum at 50° C. for at least 12 hours. The sol-gel coated separator is used, in a lithium-sulfur cell, without again exposing the layer to air or moisture.

Figure 15A:
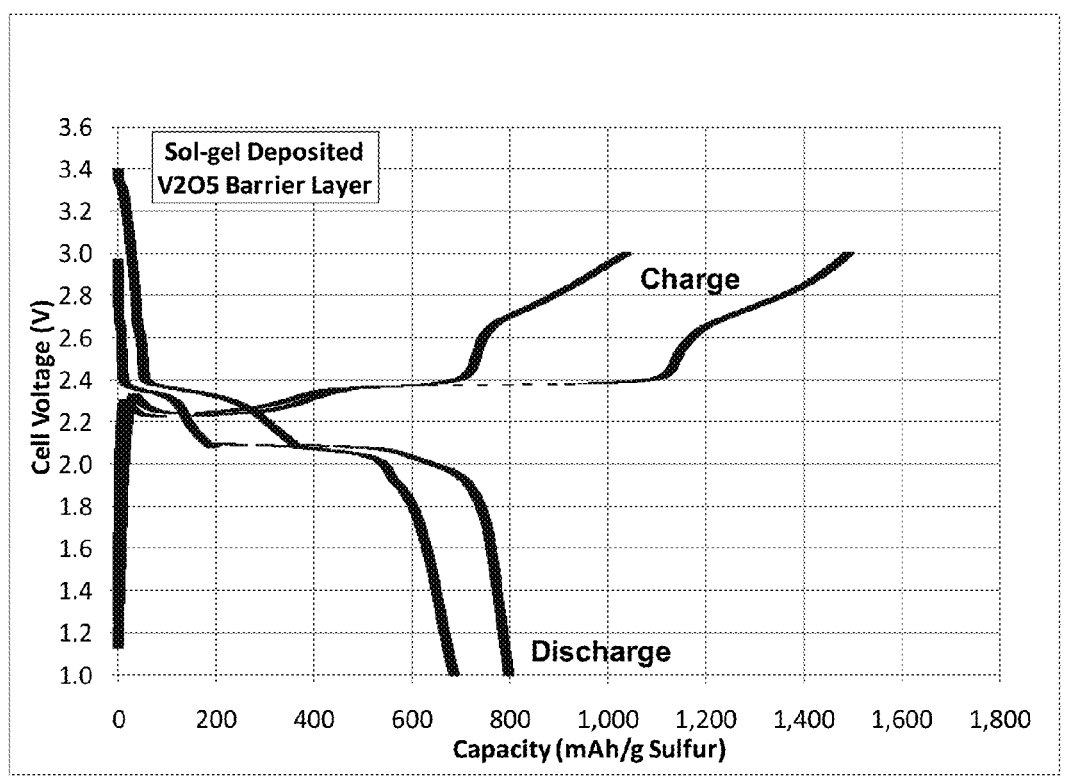
FIG. 15A shows cell voltage-versus-capacity charge and discharge curves illustrating a reduction in polysulfide crossover achieved in accordance with Example 3.
Figure 15B:
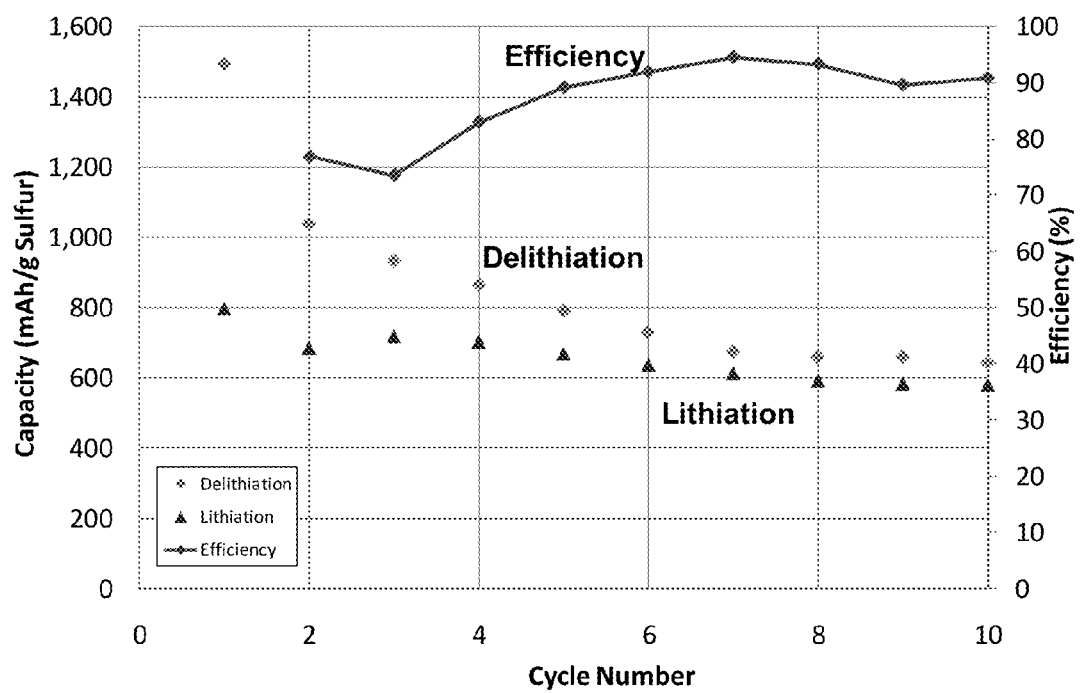
FIG. 15B depicts lithiation, delithiation, and cycling efficiency for the exemplary battery cell of Example 3.

The benefit of the sol-gel/dip-coated inorganic barrier layer is illustrated in FIGS. 15A and 15B. FIG. 15A shows cell voltage versus capacity for charge and discharge, which when compared to FIG. 14 (prior art) reveals the reduction in crossover achieved by using a sol-gel-fabricated $V_2O_5$ inorganic barrier layer. FIG. 15B shows lithiation (lithium incorporation), delithiation (lithium rejection), and cycling efficiency for the cell shown in FIG. 15A. The high cycling efficiency (about 90%) indicates that polysulfide crossover in this cell is significantly limited.

Example 4

In this Example 4, a vapor-deposition procedure is used to fabricate an inorganic barrier layer comprising $V_2O_5$. A thin crystalline vanadium oxide film is deposited onto a polymer substrate by sputter deposition using conditions as follows:

Source: Vanadium Target OD 2" V, 99.5% Pure
Method of deposition: Pulse-DC (sputtering), 100 KHz, 200 Wt
Power supply: MDX-1K+Sparc-LE V (Advanced Energy)
Vacuum chamber background pressure $3.5 \times 10^{-7}$ Torr
Vacuum chamber deposition pressure $5.0 \times 10^{-3}$ Torr
Ar=40 standard cubic cm per minute
$O_2$=20 standard cubic cm per minute
Substrate bias=−12 (V)
Distance from substrate to source h=3"
Substrate rotating speed n=5 rpm
Temperature of growth=about 50° C. (plasma discharge natural heating)
Deposition time=6 hours
Thickness d=0.5-0.6 µm (from optical interference measurements)

Figure 16:
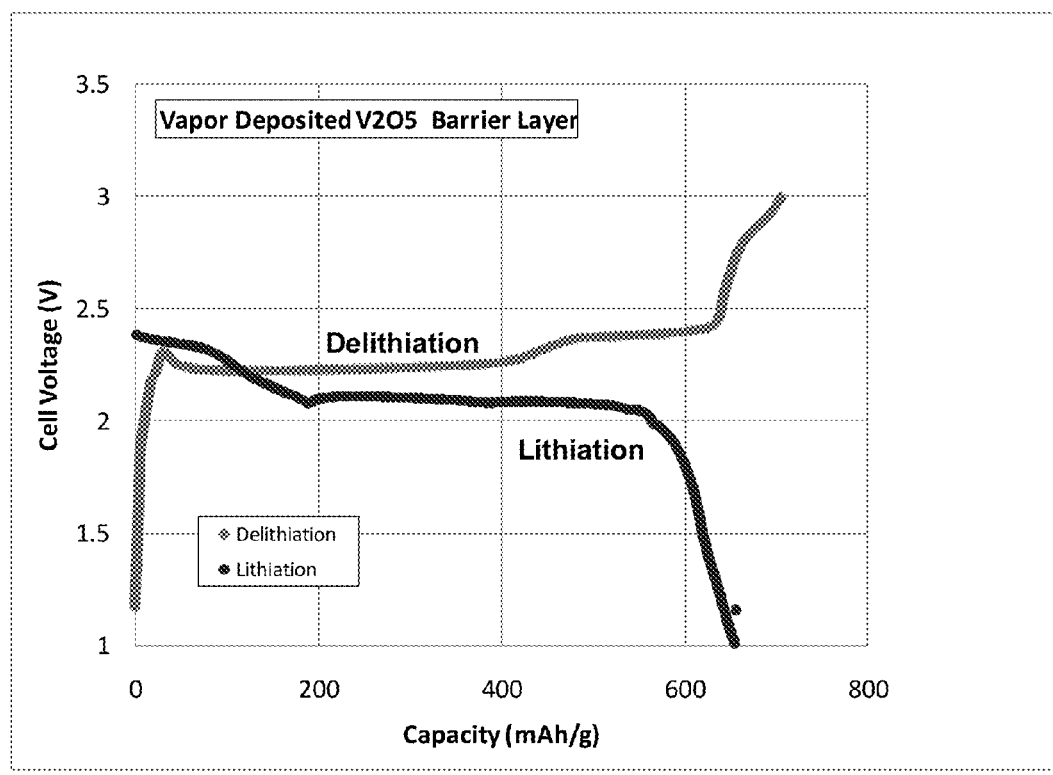
FIG. 16 plots cell voltage versus capacity, showing characteristic lithiation and delithiation curves when a $V_2O_5$ inorganic barrier layer is present in a lithium-sulfur cell, according to Example 4 herein.

The prepared inorganic barrier layer is dried under vacuum at 50° C. for at least 12 hours, and used, in a lithium-sulfur cell, without again exposing the layer to air or moisture. The $V_2O_5$ inorganic barrier layer, fabricated as described in this Example 4 and used in a lithium-sulfur cell, is tested with results indicated in FIG. 16. FIG. 16 shows cell voltage versus capacity, lithiation and delithiation curves. The effect of polysulfide crossover is dramatically reduced and the efficiency of the cell is above 90%.

Practical applications for this invention include, but are not limited to, aircraft, satellites, launch vehicles, electric cars, electric bikes, laptop computers, mobile phones, cameras, medical devices, and power tools. As will be appreciated by a person of skill in this art, the present invention has significant commercial relevance. Battery life is often a critical factor in the marketplace, especially for commercial, military, and aerospace applications (e.g., satellites). The current invention provides long-term benefits in battery safety, cost, and performance.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan. This invention also incorporates routine experimentation and optimization of the structures, systems, and methods described herein.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of fabricating a lithium-based battery cell, said method comprising coating a structurally rigid and continuous inorganic barrier layer on a substrate layer disposed between a lithium-containing anode and a cathode, providing a liquid electrolyte for transporting lithium ions between said anode and said cathode, and electrically isolating said anode from said cathode with a separator layer, wherein said inorganic barrier layer is a lithium-ion conductor and is non-permeable to at least one lithium-containing compound produced by a lithium reaction at said cathode, wherein said inorganic barrier layer has a lithium-ion conductivity from about $10^{-5}$ S/cm to about $10^{-2}$ S/cm at a temperature from −50° C. to 80° C., and wherein said inorganic barrier layer has an electronic conductivity from about $10^{-2}$ S/cm to about $10^2$ S/cm at a temperature from −50° C. to 80° C.

2. The method of claim 1, wherein said inorganic barrier layer is formed by sol-gel synthesis comprising the steps of forming a sol-gel comprising a selected inorganic compound, or a precursor thereof; applying a sol-gel layer comprising said sol-gel to a surface-modified substrate, drying said sol-gel layer, to form said inorganic barrier layer comprising said selected inorganic compound; and introducing said inorganic barrier layer into said battery cell.

3. The method of claim 2, wherein said surface-modified substrate is prepared by etching said surface to improve adhesion of said sol-gel.

4. The method of claim 2, wherein said surface-modified substrate is prepared by applying an adhesive layer to said surface to improve adhesion of said sol-gel.

5. The method of claim 2, wherein said sol-gel layer is formed by dip-coating.

6. The method of claim 2, wherein said sol-gel layer is formed by spin-coating.

7. The method of claim 1, wherein said inorganic barrier layer is formed by pulsed direct-current sputter deposition, wherein said inorganic barrier layer is a lithium-ion conductor, and wherein said sputter deposition comprises the steps of impacting a sputtering source comprising a selected inorganic compound, or a precursor thereof, with a sputtering gas under vacuum to form said inorganic barrier layer on a substrate; and introducing said inorganic barrier layer into said battery cell.

8. The method of claim 7, wherein said sputtering source comprises a selected metal, said sputtering gas comprises an oxidant that converts said selected metal to a selected metal oxide, and said inorganic barrier layer comprises said selected metal oxide.

9. The method of claim 1, wherein said lithium-based battery cell is a lithium-sulfur battery cell, and wherein said inorganic barrier layer is non-permeable to polysulfides of lithium.

* * * * *